Oct. 17, 1967     B. RANKY     3,348,139
TIME DELAY AND FREQUENCY SPECTRUM ANALYZER
Filed Dec. 31, 1963
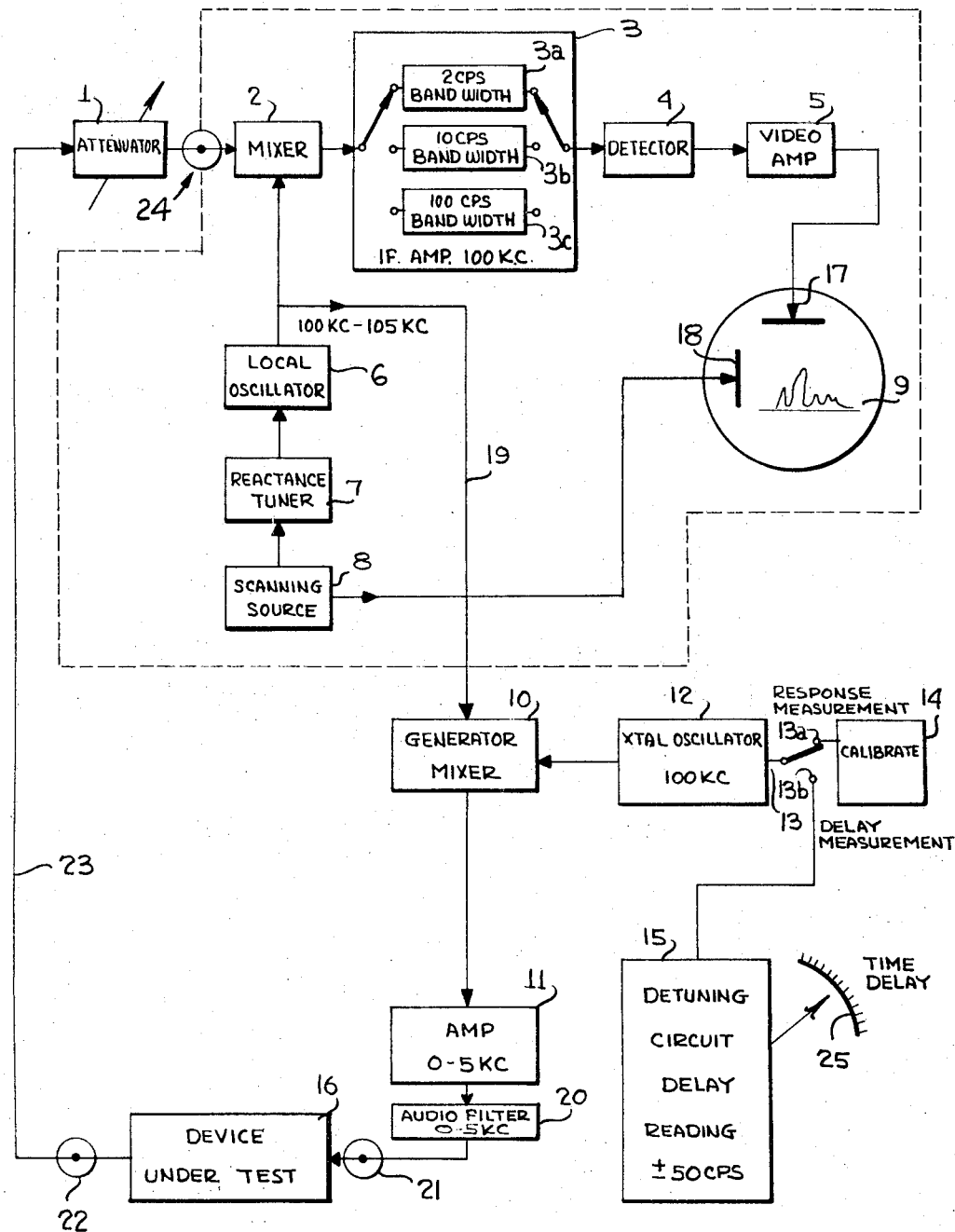
INVENTOR
BELA RANKY
BY Hurvitz & Rose
ATTORNEYS

United States Patent Office 3,348,139
Patented Oct. 17, 1967

3,348,139
TIME DELAY AND FREQUENCY SPECTRUM
ANALYZER
Bela Ranky, Flushing, N.Y., assignor to The Singer Company, a corporation of New Jersey
Filed Dec. 31, 1963, Ser. No. 334,869
11 Claims. (Cl. 324—57)

The present invention relates generally to circuit response plotting systems and more particularly to systems for obtaining plots of frequency against amplitude response for predetermined time delay or group delay introduced by an electric circuit under test.

The frequency response characteristic of an electrical circuit under test may be obtained by a response analyzer which frequency scans a constant amplitude signal through the circuit under test and measures the amplitude of the response for each input frequency. Response may be plotted against frequency as on a cathode ray tube indicator.

Scanning spectrum analyzers consist essentially of superheterodyne type receivers having scanning local oscillators, the scan of the local oscillator being synchronized with the horizontal deflection of the beam of a cathode ray tube, the vertical deflection of the beam being controlled by the output of the receiver. Such systems are in common use for analyzing bands of frequencies in a wide variety of frequency ranges.

Spectrum analyzers have been employed as elements of circuit response testing systems of the frequency scanning type, by employing the local oscillator of the spectrum analyzer as one component of a circuit scanning signal generator. In such systems, the local oscillator frequency is applied to a mixer in conjunction with a fixed frequency equal to the center frequency of the intermediate frequency (IF) amplifier of the spectrum analyzer, to provide an output signal from the mixer equal to the desired scanning difference frequency and equal at all times to the acceptance frequency of the spectrum analyzer. The input signal to the spectrum analyzer continuously scans in synchronism with the local oscillator of the spectrum analyzer, since it derives from the oscillator, so that the IF signal generated in the spectrum analyzer always falls at the center of its IF amplifier response curve throughout each scan. Accordingly, the spectrum analyzer system does not introduce a modulation or variation of amplitude due to the overall shape of its transfer characteristic, but the output of the spectrum analyzer is conditioned only by the response or transfer characteristic of the device under test.

Since spectrum analyzers are available commercially for application in a wide variety of frequency bands, the response curves or transfer characteristics of electrical circuits may be plotted for similar bands of frequencies by providing suitable accessories for the spectrum analyzers. In each case an accessory is required to derive a signal from the scanning local oscillator of the spectrum analyzer and to convert same continuously from the local oscillator frequency to the frequency to which the spectrum analyzer is instantaneously responsive. The last mentioned signal passes through the circuit under test and thence to the input terminals of the spectrum analyzer. This procedure enables effective utilization of all of the expensive frequency measuring, signal amplifying and display components of a conventional spectrum analyzer, in a response plotter, by adding relatively inexpensive elements to the spectrum analyzer.

It is often necessary not only to plot the frequency response characteristics of an electrical circuit, but also to measure the time delay introduced by a circuit as a function of frequency. For example, it may be desired to know the group delay on a given telephone circuit over a range of frequencies. This can be accomplished by the addition of inexpensive equipment to the scanning spectrum analyzer of the prior art in the following manner. A standard spectrum analyzer is employed, consisting essentially of a mixer, an IF amplifier, a detector and a video amplifier connected in cascade, the output of the video amplifier being applied to the vertical deflection electrodes of a cathode ray tube indicator. The output signal of the scanning local oscillator is applied to the mixer, the output frequency of the oscillator being controlled by a reactance tube modulator, the modulator being supplied with a saw tooth modulating voltage. The saw tooth voltage is also applied to the horizontal deflection electrodes of the cathode ray tube indicator, suitable changes of scale or shape of the saw tooth being introduced, if desired, to provide a frequency base line suited to a given application. Such a spectrum analyzer may have an acceptance input range extending from a frequency A to a frequency B cycles per second, for example, 0–5,000 cycles per second. The center frequency of the IF amplifier is set at a predetermined frequency F which could be, for example, 100,000 cycles per second. The local oscillator is then made to scan over a band of frequencies F1 to F2 of, say, 105 to 100 kilocycles per second. According to the present invention, there is also supplied a crystal oscillator source having an output frequency precisely equal to the center frequency of the IF amplifier (100 kc.). This crystal oscillator output frequency is adjustable in a narrow range, as, for example, plus or minus 50 c.p.s. This means that the frequency of the crystal oscillator can be detuned by up to + or —50 c.p.s. with respect to the center frequency of the IF amplifier. This frequency adjustment or frequency detuning is the essential feature of the present invention which provides a feasibility of measuring the delay time of signals passing through a circuit under test. The frequency detuning of the crystal oscillator can be shown to be directly proportional to the delay of a circuit under test at a given scanning rate in cycles per second. By introducing such detuning the display on the face of the cathode ray tube indicator of the spectrum analyzer becomes a frequency response curve for a predetermined value of time delay in the circuit under test.

It is, accordingly, an object of the present invention to provide a system for measuring frequency response as a function of delay time, for either active or passive electrical circuits.

It is another object of the invention to provide an accessory equipment combinable with a commercial scanning spectrum analyzer, which modifies the latter to provide a frequency response curve of a circuit under test for any one of a range of delay times, while also providing information as to the delay time.

The above and still further objects, features and advantages of the present invention will become apparent upon consideration of the following detailed description of a specific embodiment thereof, especially when taken in conjunction with the accompanying drawings, wherein:

The single figure is a block diagram of a preferred embodiment of the invention.

Referring now specifically to the accompanying drawing, the single figure illustrates a circuit response plotter capable of measuring frequency response and delay characteristics of a circuit under test. The response plotter includes a mixer 2, an IF amplifier 3 having variable IF bandwidth and illustrated as having three selectively available separate elements of different bandwidth labeled 3a, 3b and 3c, a detector 4, a video amplifier 5 and a vertical deflection electrode 17 of a cathode ray tube indicator 9, all series connected. The output frequency of a local oscillator 6 is caused to scan over the band from 105 kc. to 100 kc. periodically and repetitively by means of a reactance tube tuner 7 coupled to the mixer 2. The reactance tube tuner causes the resonant frequency of the local oscillator to change by changing the reactance of the resonant circuit of the local oscillator as the reactance tuner reactance is changed by the sawtooth voltage applied thereto by the scanning source 8. This sawtooth voltage is also applied to the horizontal deflection electrode 18 of the cathode ray tube indicator 9. The selectivity (pass band) of the IF amplifier 3 is maintained at a value adequate to the purposes of the present invention and the measurements to be made.

The local oscillator 6 is also coupled to the generator mixer 10 through an output lead 19. A crystal oscillator 12 provides an output frequency of 100 kc., this being precisely the same frequency as the center frequency of the IF amplifier 3. This is coupled to the generator mixer 10, the generator mixer providing an output signal which is equal to the difference in frequency between the output of the local oscillator 6 and the output of the crystal oscillator 12. A switch 13 having contact elements 13a and 13b couples the crystal oscillator 12 to a tuning device or calibrator 14 when in the position 13a and to a detuning circuit 15 when in the position 13b.

When the switch 13 is in the position 13a, the calibrator 14 is coupled to the crystal oscillator 12 to tune same to the IF amplifier frequency and thereby calibrate the system. In this position, the system measures the frequency response of a device under test, assuming essentially zero delay time in the circuit. In the position 13b, the detuning circuit 15 is connected to the oscillator 12 to provide between plus or minus 50 cycle per second detuning thereof with respect to the center frequency of the crystal oscillator 12. Compensation for circuit delay time is introduced in the latter switch position.

The output circuit of the generator mixer 10 is coupled to an amplifier 11 having pass band of 0 to 5 kc., the amplifier 11 feeding an audio filter 20 having a band pass of 0 to 5 kc. Terminal 21 is provided at the output of the audio filter 20 and may be connected to an input terminal 21 of a device, system or circuit to be tested, such as a telephone line, identified by the reference numeral 16. The output terminal of the device under test 16 is identified by the reference numeral 22, signals proceeding therefrom via a lead 23, and through an adjustable attenuator 1, to the input terminal 24 of the response plotter.

When the switch is in the position 13a the system operates as a conventional response plotter for a device under test 16 having negligible time delay for signals in the 0–5 kc. range. In operation with the switch in the position 13a, the input terminal 24 receives a band of frequencies from zero to 5,000 cycles per second. As the local oscillator 6 scans over its band of frequencies from 105 kc. to 100 kc., the frequency content of the input signal is sampled and converted in the mixer 2 to the IF center frequency of 100 kc., detected by the detector 4, amplified and displayed on the face of the cathode ray tube 9.

When the local oscillator 6 has a value of 100 kc., the signal frequency passed from the local oscillator to the generator mixer 10 will be identical to the signal passing from crystal oscillator 12 to the generator mixer. Accordingly, the output signal from the generator mixer will be the difference of these two frequencies or (nominally) zero cycles per second. This signal passes through the amplifier 11 and audio filter 20, through the device under test, the attenuator 1 to the input terminal 24. This input frequency of zero cycles per second is converted to the center frequency of the IF amplifier 3 since at this time the local oscillator 6 also passes a 100 kc. signal to the mixer 2. The output of the mixer will be the difference between the input signal at terminal 24 and the output signal from the local oscillator, which is 100 kc., equal to the center frequency of the IF amplifier 3. This signal is presented in respect to its amplitude on the indicator 9.

In like manner, as the output signal from the local oscillator 6 varies over the range 105 kc. to 100 kc., the output signal from the generator mixer 10 will vary from 5 kc. to zero cycles per second, this being the range of difference between the output frequency of the local oscillator 6 and of the output signal of the crystal oscillator 12. The 0–5 kc. signals are passed through the amplifier 11, the audio filter 20, the device under test 16 and attenuator 1, to the terminal 24. At any point in time, during a scan of oscillator 6, the difference between the output frequency of the local oscillator and the frequency of the signal which passes through the device under test will be 100 kc., the center frequency of the IF amplifier.

The response measurement for a device under test having essentially zero time delay is independent of the instrument IF amplifier bandwidth and the speed of scanning, but depends only upon the amplitude vs. frequency characteristic of the device under test. The above recited analysis of operation of the system with the switch in the position 13a operates properly only if (1) the device under test does not introduce any appreciable time delay in the signals passing therethrough or (2) if the band pass of the IF amplifier is sufficiently great to respond fully to signals even though subjected to delay by the device under test. Of course, there are occasions when it is necessary to utilize a very restricted bandwidth in the IF amplifier, or when the device under test provides large delays, and in either case or both, it may occur that the signals do not pass through the IF amplifier 3.

The difficulty can be readily illustrated by a numerical example. If we assume the bandwidth of the IF amplifiers 3 to be 10 c.p.s., implying that the IF amplifier 3 can pass signals with no more than a 3 db gain variation in the frequency range from 99,995 c.p.s. to 100,005 c.p.s. and if the particular device under test were to delay the signal passing therethrough by 6 c.p.s., for a given scan rate, a signal of frequency 5,000 c.p.s. will arrive at the mixer 2 when the output frequency of the local oscillator 6 is 104,994 c.p.s. The difference frequency will be 99,994 c.p.s., a frequency which does not fall within the + or − 3 db range of the IF amplifier. Therefore, the indicator 9 will provide an incorrect reading. A correct reading can be attained by detuning the crystal oscillator 12 sufficiently to bring the IF signal centrally of the IF pass band. To this end the detuning circuit is adjusted to offset the delay of the signal, introduced by the device under test. By adjusting the detuning circuit until a maximum reading is achieved on the indicator 9, delay time can be read in terms of the extent of detuning, and such time delay can be read off directly on scale 25, suitably calibrated.

It will be appreciated by those skilled in the art that crystal oscillator 12 and local oscillator 6 may be sufficiently stable and accurate as to render calibration procedures unnecessary once the oscillator frequencies have been preset to their desired values. Under such conditions, time delay indicator 25 may be calibrated directly in delay time with respect to a defined zero delay indication. This is true since only one part in $10^5$ accuracy is required to maintain the input signal to IF amplifier 3 at a frequency of 100 kc. ±1 c.p.s., and stable oscillators or much higher order accuracies are well known in the art. If, however, less accurate oscillators are employed, the system may be calibrated before performing a time delay and frequency response measurement by connecting a device of negligible time delay between terminals 21 and 22 when switch 13 is in position 13b. Detuning circuit 15 may then be adjusted to maximize the indication at indicator 9. The time delay and frequency response measurement may then be performed as described above on the device under test which is appropriately connected between terminals 21 and 22 in place of the negligible delay device. The delay time of the device under test may be obtained by noting the difference between the calibration and measurement settings of time delay indicator 25.

Though the invention has been described with regard to a specific embodiment, many variations and modifications will become obvious to those skilled in the art. It is therefore the intention that the appended claims be interpreted as broadly as possible in view of the prior art.

What I claim is:

1. A system for measuring time delay of a signal in passing through a circuit under test, comprising a superheterodyne receiver including a mixer, a narrow band intermediate frequency amplifier and an indicator connected in cascade, a sweeping local oscillator coupled to said mixer, a further fixed frequency oscillator, means for varying the fixed frequency of said further oscillator at will, said further oscillator having a nominal frequency equal to the frequency of said intermediate frequency amplifier, conversion means responsive to said sweeping local oscillator and said further oscillator for generating a sweeping test signal, means for passing said test signal through said circuit under test and deriving a delayed response signal from said circuit under test, means applying said delayed response signal to said mixer for conversion to a frequency value adjacent to said intermediate frequency but displaced therefrom as a function of said delay, and means for varying said fixed frequency to an extent compensatory of said delay as indicated by a response in said indicator.

2. A system for measuring time delay of a scanning signal covering a predetermined band in passing through a circuit under test, comprising a scanning superheterodyne spectrum analyzer, said analyzer including a scanning local oscillator, a mixer connected to said scanning local oscillator, said mixer including an input terminal and an output terminal, and an intermediate frequency amplifier connected to said output terminal, means responsive to the output of said scanning local oscillator for generating said scanning signal, means applying said scanning signal through said circuit under test to said input terminal, said intermediate frequency having a value at all times equal to a heterodyne product of said output of said local oscillator and said scanning signal for a circuit under test having zero delay time, and means for varying the scanning relation of said output of said scanning local oscillator and said scanning signal to compensate for delay time of said circuit under test.

3. A system for measuring time delay of a signal in passing through a circuit under test, comprising a superheterodyne receiver including a mixer, a narrow band intermediate frequency amplifier and an indicator connected in cascade, a sweeping local oscillator coupled to said mixer, a further fixed frequency oscillator, means for varying the fixed frequency of said further oscillator at will, said further oscillator having a nominal frequency equal to the frequency of said intermediate frequency amplifier, conversion means responsive to said sweeping local oscillator and said further oscillator for generating a sweeping test signal, means for passing said sweeping test signal through said circuit under test and for deriving a delayed response signal from said circuit under test, means applying said delayed response signal to said mixer for conversion to a frequency value adjacent to said intermediate frequency but displaced therefrom as a function of said delay, and means for varying one of said fixed frequency and the mean frequency of said sweeping local oscillator to an extent compensatory of said delay as indicated by responses of said indicator.

4. The combination according to claim 3 wherein said indicator is a visual indicator presenting a plot in two coordinate directions of amplitude of said response against frequency of said sweeping test signal.

5. A system for measuring time delay in a circuit under test of separate frequency components of a frequency spectrum, comprising a source of a scanning frequency signal, means for passing said scanning frequency signal through said circuit under test and for deriving a response of said circuit under test to said scanning frequency signal, and means for converting said response to a fixed frequency for all frequency values of said scanning frequency signal and for all time delays of said signal in passing through said circuit under test.

6. A system for measuring time delay in a circuit under test of distinct frequency components of a frequency spectrum, comprising a source of scanning frequency, a source of adjustable frequency, a mixer responsive to said scanning frequency and said adjustable frequency for deriving a difference frequency, said scanning frequency and said adjustable frequency being selected to provide said difference frequency as said frequency spectrum at the output of said mixer, means for passing said spectrum through said circuit under test and for deriving a response from said circuit under test, means responsive to said response and to said scanning frequency for deriving an approximately constant frequency throughout the scan of said scanning frequency, and means for varying said approximately constant frequency to compensate for said time delay.

7. The combination according to claim 6 wherein is provided a visual indicator responsive to said response and to said scanning frequency for presenting a visual plot of the transfer characteristic of said circuit under test for essentially one value of said time delay.

8. In combination, in a system for measuring delay time in a test circuit, a scanning spectrum analyzer, an accessory device responsive to a scanned frequency derived from said scanning spectrum analyzer for generating a test signal, means applying said test signal to said test circuit and deriving a response therefrom, said accessory device including a device adjustable to provide said response only when adjusted to correspond with said delay time.

9. In a system including a scanning spectrum analyzer, said spectrum analyzer including a frequency scanning frequency converter, a narrow band filter coupled in cascade to to said frequency converter, and an indicator responsive to the output of said narrow band filter for plotting the amplitude of said output against the scanning frequency of said converter, the combination of a further frequency converter responsive to said scanning frequency for generating a frequency scanning test signal, and means for adjusting the relative timings of the scans of said test signal and of said scanning frequency converter.

10. The combination according to claim 9 wherein is provided means for conveying said test signal to a test circuit, and for conveying the response of said test circuit to an input of said frequency scanning frequency converter.

11. An accessory for a scanning superheterodyne spectrum analyzer including a scanning local oscillator and an input terminal, comprising a mixer having input circuits, an adjustable oscillator coupled to an input circuit of said mixer, means for coupling another input circuit of said mixer to said scanning local oscillator, said mixer generating a responsive scanning test signal subject to time delay in a test circuit, and means for applying the time delayed test signal to said input terminal, and means for adjusting said adjustable oscillator to a frequency value compensatory of said delay and for reading off the adjustment.

No references cited.

RUDOLPH V. ROLINEC, *Primary Examiner.*

P. F. WILLE, *Assistant Examiner.*